Sept. 23, 1924.  
E. L. MOORE  
1,509,764
COMBINATION FENDER BRACE AND BUMPER
Filed Oct. 3, 1923  2 Sheets-Sheet 1
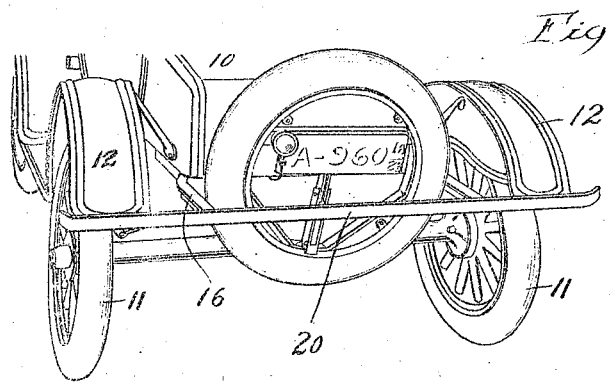
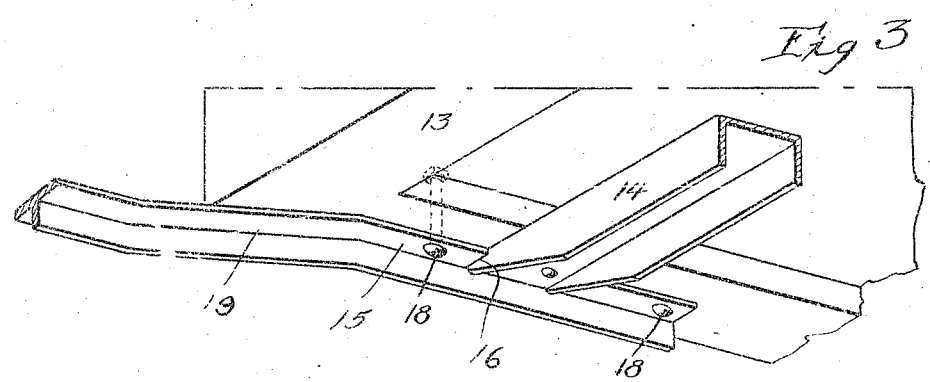
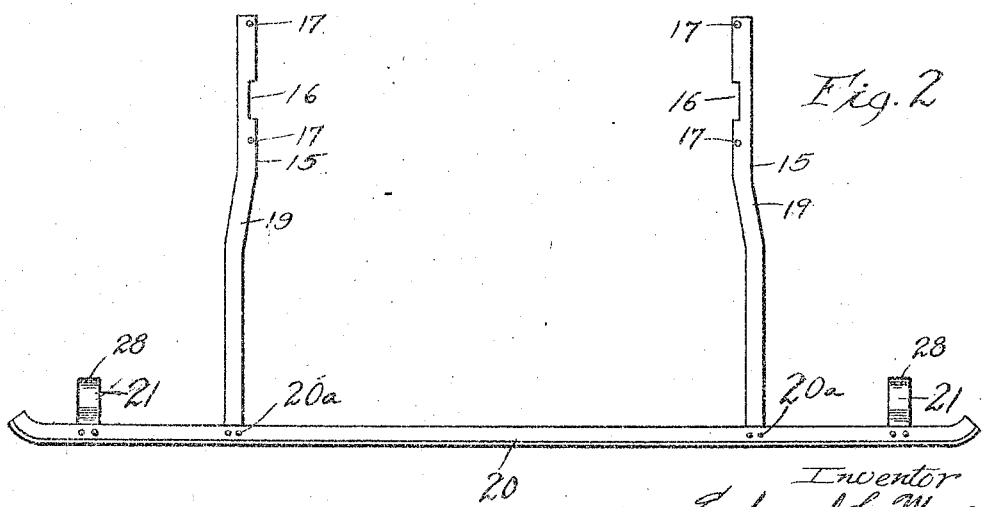

Sept. 23, 1924.  
E. L. MOORE  
COMBINATION FENDER BRACE AND BUMPER  
Filed Oct. 3, 1923   2 Sheets-Sheet 2
1,509,764
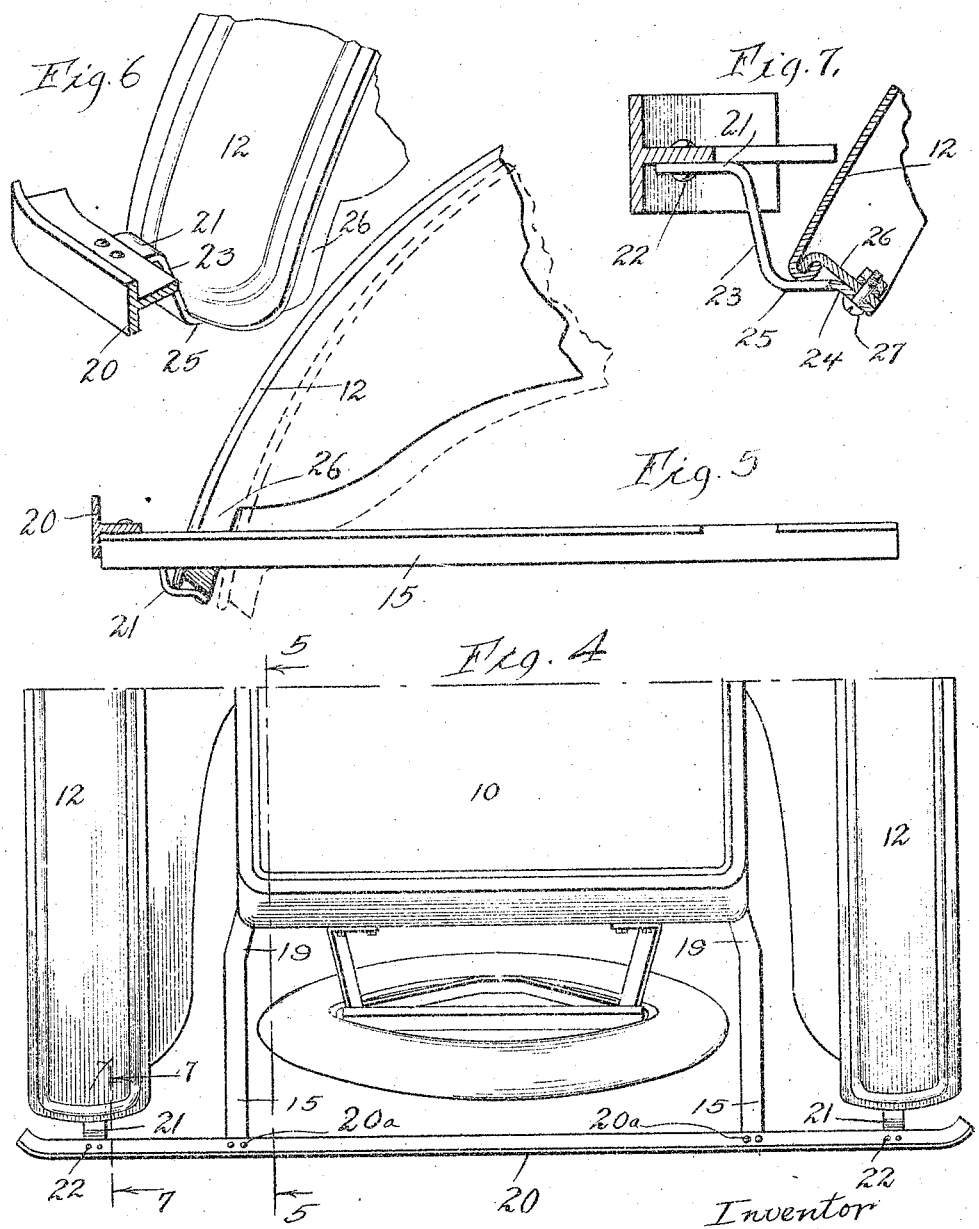

Patented Sept. 23, 1924.

1,509,764

UNITED STATES PATENT OFFICE.

EDWARD L. MOORE, OF WATERLOO, IOWA, ASSIGNOR TO ALVAH H. WARREN, JR., OF ST. PAUL, MINNESOTA.

COMBINATION FENDER BRACE AND BUMPER.

Application filed October 3, 1923. Serial No. 666,291.

*To all whom it may concern:*

Be it known that I, EDWARD L. MOORE, a citizen of the United States, and a resident of Waterloo, in the county of Black Hawk and State of Iowa, have invented a certain new and useful Combination Fender Brace and Bumper, of which the following is a specification.

The object of my invention is to provide a combination fender brace and bumper, which is simple in construction, and which can be readily and easily attached to an automobile.

More particularly, it is my object to provide a combination fender brace and bumper, which will serve to brace the fenders of the automobile for preventing any vibration thereof and to provide a bumper member, which will prevent the fenders from becoming injured and at the same time to connect the two fenders together, wherein the fenders will be braced relative to the vehicle and relative to each other.

In this connection, it may be mentioned that in some makes of automobiles, the rear fenders are not provided with any braces near their rear ends and are therefore subject to a considerable amount of vibration and soon become multilated, and it is my object to connect the fenders together by means of a transverse brace or bumper member and at the same time connect the rear ends of the fenders to the vehicle body through the medium of a portion of the brace or bumper member.

With these and other objects in view, my invention consists in the construction, arrangement and combination of the various parts of my combination fender brace and bumper, whereby the objects contemplated are attained, as hereinafter more fully set forth, pointed out in my claims, and illustrated in the accompanying drawings, in which:

Figure 1 is a perspective view of the rear end of an automobile with my improved combination fender brace and bumper installed therein.

Figure 2 is a top plan view of my combination fender brace and bumper.

Figure 3 is a perspective view of a portion of the under side of the chassis of an automobile showing a portion of the combination fender brace and bumper member secured thereto.

Figure 4 is a top plan view of the rear end of an automobile having my combination fender brace and bumper installed thereon.

Figure 5 is a sectional view taken on the line 5—5 of Figure 4, the dotted line position showing the fender before it is connected to the combination fender brace and bumper.

Figure 6 is a detail, sectional perspective view showing the connecting plate between the transverse brace or bumper and the fender, wherein the fender is braced against movement relative to the vehicle body; and Figure 7 is a sectional view taken on the line 7—7 of Figure 4.

In the accompanying drawings, I have used the reference numeral 10 to indicate generally an automobile body preferably of the Ford type, which is provided with the rear wheels 11 and the rear fenders 12.

The body 10 of the automobile rests upon a frame 13, which in turn is sported by the chassis of the automobile.

A cross brace 14, channel-shaped in cross section, forms a part of the chassis of the automobile.

My improved combination fender brace and bumper comprises a pair of supporting and connecting members 15, which are shown as formed of T-iron in the drawings, but it will be understood that any suitable beam or angle iron may be used.

The supporting and connecting members 15 are each provided with notches 16, which are designed to permit the ends of the cross brace 14 to be partially received therein, when the combination fender brace and bumper is installed in position as clearly shown in Figure 3 of the drawings.

Openings 17 are formed in each of the supporting and connecting members 15 and bolts 18 extend therethrough and through openings formed in the frame 13 of the automobile body 10. The bolts 18 are used for connecting the combination fender brace and bumper to the automobile.

In the drawings, I have shown the combined supporting and connecting members as having a portion resting against the underside of the frame 13.

The providing of the notch 16 in the combined supporting and connecting members 15 enables me to so arrange the supporting and connecting members relative to the cross brace 14, as will reinforce and more efficiently hold the combined supporting and connecting members to the automobile body.

The combined supporting and connecting members 15 project rearwardly beyond the body 10 of the automobile and are provided with outwardly extending offset portions 19, so that the distance between the rear ends of the combined supporting and connecting members is greater than the distance between the inner or forward ends of the same, as clearly shown in Figure 2 of the drawings.

The purpose of providing the offset portions 19 in the supporting and connecting members 15 is to permit a spare tire to be secured to the automobile body without being interfered with by the members 15.

The rear ends of the combined supporting and connecting members 15 are riveted to a bumper member 20 by means of the rivets or the like 20ª. The bumper member 20 has its ends project beyond the combined supporting and connecting members 15 which extend directly in back of the fenders 12.

The fenders 12 and the bumper member 20 are connected together by means of connecting plates 21. The connecting plates 21 are secured to the bumper member 20 by means of the rivets 22.

The particular bumper member shown in the drawings is formed of T-iron and the connecting plate 21 is secured to one part thereof as clearly shown in Figure 7 of the drawings.

The connecting plate 21 is formed with an inclined portion 23 and with an inclined portion 24. The inclined portions 23 and 24 of the plate 22 are connected together by a substantially horizontal portion 25. The inclined portion 24 of the plate 21 rests against a flange 26 formed on the fenders 12. Stove bolts 27 extend through openings 28 formed in the connecting plates 21 and also extend through openings formed in the flange 26.

From the construction of the parts just described, it will be seen that the bumper member 20 is securely fastened to the rear fenders 12.

The bumper member 20 serves as a transverse brace between the rear fenders 12 and by using the connecting plates 21 and the combined supporting and connecting members 15, I am able to brace each fender relative to the body of the automobile, so that with my device, I brace both of the fenders relative to the body, and at the same time brace each of them against movement independently of the other.

The combined supporting and connecting members serve to support the bumper member 20 and at the same time serve as a medium for connecting the fenders 12 to the automobile body.

The fenders 12, when the combination fender brace and bumper is installed, are placed under a certain amount of tension, so that when installed, the fenders will be thoroughly and efficiently braced against any vibration. The fenders are sprung from the position shown in dotted lines in Figure 5 of the drawings to the position shown in solid lines when the combination fender brace and bumper is installed.

Some changes may be made in the arrangement and construction of the various parts of my combination fender brace and bumper, without departing from the essential features and purposes of my invention, and it is my intention to cover by my claims, any modified forms of structure or use of mechanical equivalents, which may be reasonably included within their scope.

I claim as my invention:

1. The combination with an automobile body having a pair of fenders, combined supporting and connecting members fixed to the automobile body and extending rearwardly therefrom, a bumper secured to the free ends of said members and having its ends projected beyond said members and in the rear of said fenders, and a plate secured to said bumper at each end and to the fender at its other end for holding the fenders against movement relative to the automobile body.

2. In combination with an automobile body having a pair of fenders, combined supporting and connecting members fixed to the automobile body and extending rearwardly therefrom, said members having notches therein for engaging a cross brace on the automobile body, a bumper secured to the free ends of said members and having its ends projected beyond said members and in the rear of said fenders and connecting means for fastening the fenders to the bumper wherein movement of the fenders relative to the automobile body and relative to each other will be eliminated.

3. In combination with an automobile body having a pair of fenders, combined supporting and connecting members fixed to the automobile body and extending rearwardly therefrom, a bumper secured to the free ends of said members and having its ends projected beyond said members and a plate secured to said bumper at each end and to the fender at its other end for holding the fenders against movement relative to the automobile body.

4. In combination with an automobile body having a pair of fenders, combined supporting and connecting members fixed to the automobile body and extending rearwardly therefrom, a bumper secured to the free ends of said members and having its ends projected beyond said members and spaced from said fenders, and a plate secured to said bumper at each end and to the fender at its other end for holding the fenders against movement relative to the automobile body.

Des Moines, Iowa, September 17, 1923.

EDWARD L. MOORE.